United States Patent [19]
Wainwright

[11] Patent Number: 4,618,499
[45] Date of Patent: Oct. 21, 1986

[54] METHODS FOR MAKING FILLED EXTRUDED FOOD PRODUCTS

[75] Inventor: Andrew R. Wainwright, Reading, England

[73] Assignee: United Biscuits (UK) Limited, Edinburgh, Scotland

[21] Appl. No.: 701,684

[22] Filed: Feb. 14, 1985

[51] Int. Cl.[4] .............................................. A21D 13/08
[52] U.S. Cl. .................................... 426/283; 426/143; 426/94
[58] Field of Search .................... 426/282, 283, 89, 92, 426/94, 105, 279, 138, 140, 143, 512, 513, 514, 516; 264/209.3, 146, 150, 152; 156/500, 244.12; 425/131.1, 133.1

[56] References Cited

U.S. PATENT DOCUMENTS

| 1,542,710 | 6/1925 | Laskey | 426/297 |
| 2,960,045 | 11/1960 | Pentzlin | 426/284 |
| 3,551,161 | 12/1970 | Whitestone | 426/283 |
| 3,751,202 | 8/1973 | Coleman et al. | |
| 4,275,647 | 6/1981 | Chambers et al. | 426/94 |
| 4,283,430 | 8/1981 | Doster et al. | 426/94 |
| 4,309,450 | 1/1982 | Seibert | 426/92 |

FOREIGN PATENT DOCUMENTS 0071183  2/1983  European Pat. Off. .

Primary Examiner—Raymond N. Jones
Assistant Examiner—Carolyn Paden
Attorney, Agent, or Firm—Young & Thompson

[57] ABSTRACT

Filled food products are made by cooking and extruding a casing, in the form of a closed loop in cross-section, moving it past a knife so that it becomes slit open and then introducing one or more fillings into the casing through inlet ducts which pass through the opening formed by the knife, a system of forces being arranged to close up the opening or at least, to prevent it from opening or widening. Introduction of the filling material is preferably spaced downstream from the knife, so that the opening can allow steam or other vapor evolved from the casing to escape.

5 Claims, 6 Drawing Figures

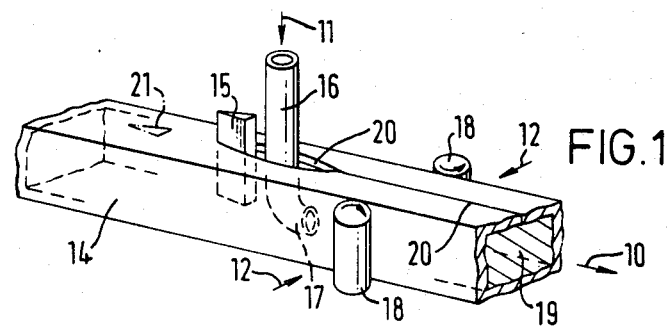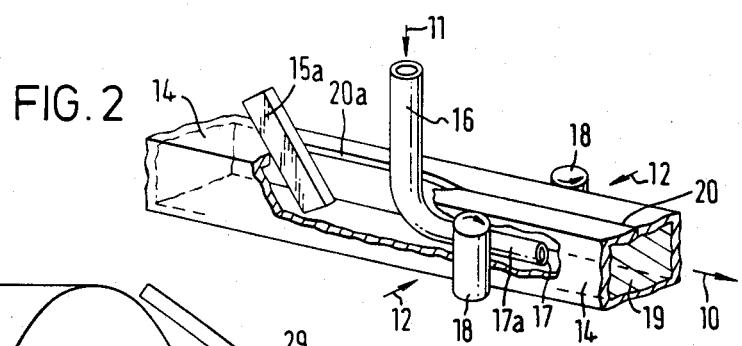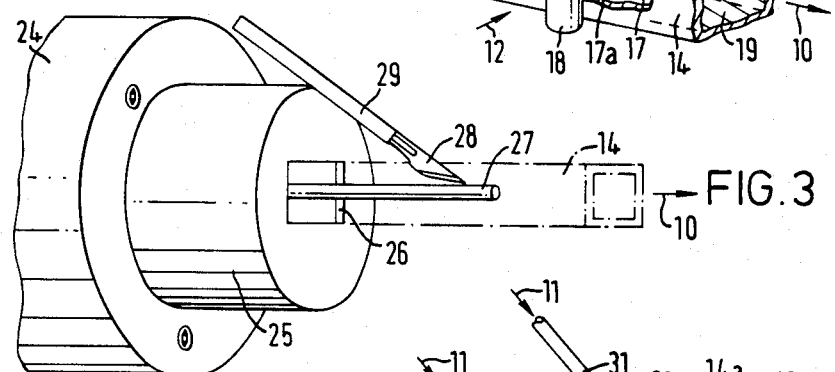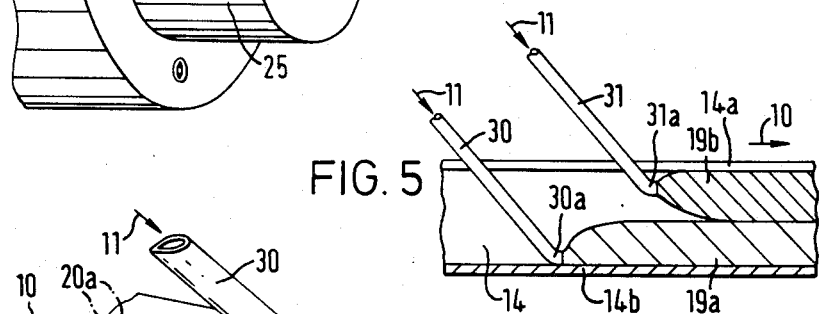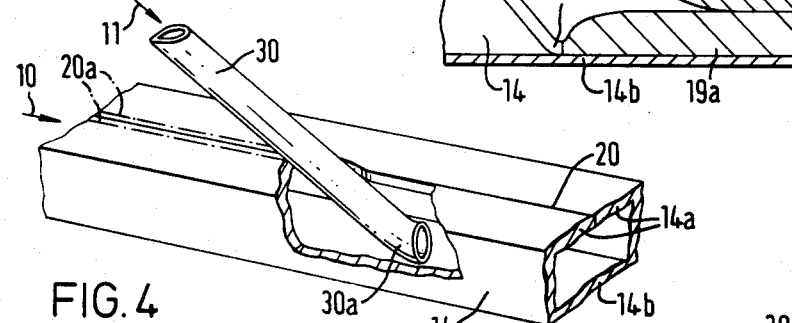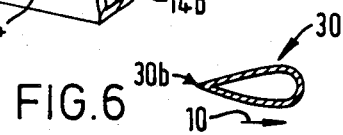

METHODS FOR MAKING FILLED EXTRUDED FOOD PRODUCTS

This invention relates to methods for making filled extruded products and is concerned particularly with such methods and apparatus in which the extrusion cooking of food product components is involved, and to the products produced thereby.

In the manufacture of foodstuffs, such as snack foods of various kinds, it is a common practice to use extrusion methods. Filled snack products, for instance, can be made by a process of co-extrusion, in which a casing material is extruded through an annular die, simultaneously with a filling material which is extruded through a central mandrel. In carrying out such coextrusion methods, cooking or other treatment of one or both of the materials often takes place, as the materials pass through the co-extrusion nozzles used, so that at least one of the materials may expand or otherwise undergo change as it is discharged. Although they are extensively in use, co-extrusion methods and apparatus can give rise to difficulties in practice, however. For instance, US-A-No. 3751202 refers to problems which arise due to the characteristics of the different materials, citing the scorching or burning of a meat filling, due to the high temperature needed for satisfactory production of a protein casing, or adverse effects caused by premature cooling of the casing itself, as heat is lost to the meat filling. Another main cause of difficulty with co-extrusion techniques is the steam and/or other gases or vapours which can be evolved from either or both of the materials as they undergo co-extrusion, especially if the steam or other gaseous material is given off by the filling material inside the casing. Attempts to alleviate such problems include the application of suction at the annular region where the casing meets the filling material. Such an arrangement is disclosed in published European application No. 0071183, for instance.

A further cause of difficulty in co-extrusion is that the casing material must necessarily pass to either side of the conduit which directs the filling material to the mandrel and irregularities can easily occur in the extruded casing, because the material does not rejoin satisfactorily downstream of the supply conduit, sometimes resulting in incomplete formation of the casing. Although co-extrusion is an obvious principle to adopt in the manufacture of products which consist of a tubular casing containing a core-like filling, this principle can give rise to notable technical difficulties and the present invention avoids these by dispensing with co-extrusion. As a result, much closer control can be achieved by simpler means. Extrusion is employed in carrying out the invention, because it is an especially convenient way of preparing tubular casings, but the invention allows simpler control of the materials being used. Also, as the supply of each material is largely independent of the other, a failure or defect in the supply of one material can be readily followed by a stoppage of the other, so that excessive wastage of materials is easily avoided.

According to the present invention, a method for making filled extruded products is provided, wherein a casing material is extruded in the form of a unitary tubular component having a cross-section of closed-loop shape, the extruded casing has a longitudinal opening made in it by being advanced relative to a cutter member and the casing is then filled by being advanced past at least one supply duct for filling material located downstream of the cutter member, so as to pass through the longitudinal opening into the extrudate, whereby the or each filling material is introduced into the extrudate, a force system which tends to close the longitudinal opening being arranged to act upon the extruded casing downstream of the location of the or each supply duct.

In carrying out the invention, the force system can be arranged to close the longitudinal opening in the extrudate or, instead, it can be arranged to reduce, or even merely prevent any increase in, the width of the longitudinal openings. In general, the force system acts directly upon the unitary extrudate and, moreover, in most practical forms of the method and the apparatus, the force system operates in a region located downstream of the discharge outlet from the or each supply duct for the filling material. Usually, such a region is also downstream of the position of entry of the or each supply duct into the longitudinal opening formed in the extrudate by the cutter. It is also possible, in an alternative arrangement, to carry out the invention so that the region of operation of the force system is upstream of the discharge outlet from the supply duct, which is therefore arranged to pass through the opening and, within the extruded casing, to extend through the region of operation of the force system, so as to discharge on its downstream side. It has been found that, because the tubular casing component is formed as a unitary extrudate before it is opened up by the cutter member, it can be arranged to complete any expansion or other change in configuration between leaving the extrusion nozzle and reaching the cutter member. Thus, its shape is stabilized before it is slit open and therefore before the or each filling material is fed into it, so that it has a tendency to retain or resume this stabilised shape and therefore the edges on either side of the opening remain in contact.

In any embodiment of the invention, the (or each) supply duct can, if required, be arranged to extend in the downstream direction within the extrudate so that its outlet end is located beyond the region of application of the force system which causes or allows the longitudinal opening to close; in this way, the tubular casing has already attained its final stabilised form before the discharge of the filling material into it, so that the desired degree of filling can be achieved irrespective of the cross-section of the tubular casing upstream of the region of action of the force system.

In another preferred embodiment, the or each supply duct extends through the longitudinal opening formed in the tubular casing component and the filling material is supplied as required so as to fill the core of the tubular casing. For instance, two filling materials, e.g. of different colours, can be supplied through respective supply ducts. One supply duct located nearer the cutter member can supply a lower filling material and its outlet end is preferably located near the bottom of the space inside the casing, the rate of supply being regulated so that the first filling material fills the lower part of the casing. The outlet end of the second duct, which is preferably located somewhat further downstream in the longitudinal opening, is preferably located in the upper part of the hollow inside of the casing, so that the second filling material is discharged on to the first and the casing is thus fully filled.

In carrying out the invention therefore, the extrudate has a cross-section of closed-loop form, which is identical or closely similar to the cross-section of the casing in the resultant filled product; a single opening only is made in the casing and, for this purpose, a knife or other cutter member is disposed on the upstream side of the supply duct (or ducts) for the filling material and this cutter member forms an opening, which can be either a slit or a slot, in the extrudate to allow the filling material to be introduced; the cutter member is preferably arranged to form a slit. i.e. it makes an opening without removing material from the tubular casing, and, if this is done, it is possible to carry out the method so that the force which operates in the downstream region is provided by the natural tendency of the material of the tubular casing to resume its original shape, so that the opening closes itself. Other forms of this embodiment can be devised, however, in which positive pressure is applied to close the slot or slit produced in the wall of the casing as it advances past and is therefore held apart by the width of the supply duct; the need to operate in this way depends upon a number of factors, many of which are capable of precise control, including the pressure exerted upon the casing by the injected filling and the nature of the materials forming the filling and the casing.

The cutter member can be a knife blade or other sharp edge, which is stationary or which operates about a stationary axis, e.g. by reciprocating along an axis fixed in relation to its intersection with the casing. The cutter also is preferably inclined to the direction of advance of the extrudate, an especially preferred arrangement being one in which the fixed or reciprocated blade is inclined to the extrudate so that the wall of the casing is opened from the outside to the inside. The cutter member can also be a rotary knife, as opposed to a straight blade, and can be driven so as to rotate about a stationary axis. Again, it is preferable for the knife to open the casing from the outside to the inside.

In any embodiment of the invention, it can be advantageous to arrange for the force system to include a component in the direction of advance of the product. For instance, rollers acting upon the casing can be driven so as to exert a pulling or stretching action on the product, which is advantageous in consolidating it and generally affecting its final shape and form. Alternatively a system of driven belts can be used in place of rollers to give a more positive control of the force system for forming the final shape. In the various embodiments of the invention referred to above and described below in conjunction with the accompanying drawings, the direction in which extrusion is effected can be selected as desired in order to carry out manufacture as conveniently as possible. For simplicity, the drawings show various procedures in which the direction of extrusion is essentially horizontal, but it is to be understood that an inclined or vertical arrangement can also be employed, if desired. The optimum choice depends upon the nature of the materials in use, in many instances; vertically downward extrusion can be very suitable, for instance.

According to an important preferred feature of the invention, the supply duct (or the first, if more than one is used) is spaced downstream from the cutter member by a substantial distance, relative to the other dimensions in use, i.e. so that any water vapour or other gaseous or volatile substance or agent evolved from the extruded and cooked casing can escape via the longitudinal opening, before the filling step per se begins. For this reason, the longitudinal opening is preferably formed in the uppermost part of the tubular extrudate. It has been found that the problems which can arise with co-extrusion cooking can be completely avoided by use of the present invention.

In order that the invention may be readily understood, various embodiments of the method of the invention and of apparatus for carrying out the invention are described below in conjunction with the accompanying drawing, in which:

FIG. 1 shows a diagrammatic perspective view of a preferred embodiment of the method and apparatus of the invention;

FIG. 2 shows a diagrammatic perspective view similar to FIG. 1, but illustrating features of alternative ways of carrying out the invention;

FIG. 3 shows a diagrammatic perspective view of a cooker/extruder die, mandrel and cutter member, for carrying out the first steps in the production of a filled extruded food product;

FIG. 4 shows a diagrammatic perspective view of a filling supply tube, for carrying out the remaining steps in the production of a filled extruded food product;

FIG. 5 shows a sectional view of a preferred arrangement for putting two separate fillings into a cooked extrudate;

FIG. 6 shows a preferred form of filling tube, in cross-section, for use in carrying out the invention as shown in FIGS. 4 and 5.

In the following description of the accompanying drawings, reference 10 designates an arrow indicating the direction of advance of the extrudate, from which the tubular casing of the filled product is made, reference 11 is an arrow indicating the introduction of filling material which might consist of a cream, confectionery or other sweet filling or alternatively a savoury filling based on for example cheese or meat. The invention also permits the possibility of using more than one filling material thus producing products with multiple fillings. The filling material is fed to a supply duct 16 which conveys it for discharge within an extrudate 14 and reference 12 is an arrow indicating the direction of application of a force, one or more of such forces 12 forming a force system which tends to close the opening in the filled extrudate 14/19, i.e. by wholly or partly closing it or preventing it from widening further, in a position downstream of the location of the supply duct within such opening. The extrudate 14 advancing in the direction 10 typically comprises a mixture comprising expanded pregelatinized starch, for instance.

Referring to the embodiment of the invention shown in FIG. 1, a filling material 19 is introduced into an extrudate 14, which is made in a form having a closed-loop cross-section, by way of an opening which is formed before, i.e. upstream of, or as the extrudate 14 advances past the supply duct 16. As indicated at the left-hand end of FIG. 1, the extrudate 14 is formed with a cross-section which is a square or rectangle, although a closed-loop cross-section of any other shape can of course be used. Upstream of the supply duct 16, a cutter member 15, such as a stationary vertical knife, is located so as to extend down into the interior of the extrudate 14 from the outside and it separates the upper web of the extrudate 14, as the latter approaches the supply duct 16, which can thus have its outlet end 17 located within the open core of the extrudate 14, so that the filling material 19 can be discharged through the resultant longitudinal opening 20 into the extrudate 14. The cutter member 15 can be positioned close to the supply duct 16, for instance by being mounted upon it, or it can be mounted upon the same support arrangements (not shown) as the supply duct 16. Lateral pressure is preferably applied to the filled extrudate 14 downstream of the supply duct 16, for instance by a pair of vertical rollers 18, which produce the force system 12 required. The cutter member 15 need not be closely adjacent the supply duct 16 and can be and preferably is mounted further upstream of it, for instance as shown in dotted lines at 21. Generally, it is preferable to arrange the cutter member 15 so that it is a substantial distance upstream of the supply duct 16. For instance, if the extrudate 14 is rectangular and the conditions under which it is made cause it to assume dimensions in the range from 5-30 mm in width and from 5-30 mm in height, e.g. 19×16 mm, the cutter member 15 can be positioned from 5-50 cm, e.g. 30 cm, upstream of the supply duct 16. This ensures that the extrudate 14 stabilizes in shape as it advances from the cutter 15 to the filling material supply duct 16 and air, steam or other gaseous or vaporous materials can be largely or wholly eliminated from the outside and also from the inside of the casing, the latter by way of a slit or slot 20 produced by the cutter 15 as a longitudinal opening in the product casing constituted by the extrudate 14. The slit 20 or other form of the opening may remain closed except where it is held open by the cutter 15 and/or the duct 16, so that the forces 12 comprise the inherent tendency of the extrudate 14 to retain its stabilised cross-section, or the slit 20 or other opening may remain open until the extrudate 14 advances to the region of application of the forces 12, e.g. by the laterally arranged rollers 18. The rollers 18 or other means for applying the force system 12 to urge or allow the opening in the extrudate 14 to close are preferably arranged so that the slot 20 is closed up at least by the time the filled extrudate 14 passes the region where this force system 12 is applied. However, the slot 20 can be arranged to close, depending upon the nature of the material and its ability to return to its original position, immediately downstream of the supply duct 16. Gases or vapours, e.g. steam, evolved from either the extrudate 14 or the filling material 19, as the process of manufacture proceeds, escape in a highly satisfactory way, through the slot 20 or other opening. Where products are being made where such evolution of gas or vapour occurs, it may be preferable to arrange closure of the opening 20, to the extent desired, downstream of the outlet 17 from the supply duct 16 and therefore of the region where this evolution mainly occurs.

The rollers 18,18 can be driven or they can be replaced by a system of driven belts, so as to assist the advance of the product and, in particular, so as to increase the speed of this advance. This feature can be employed so as to subject the product to a pulling or stretching action and can thus participate in determining the shape of the final product.

It is surprisingly found that the method of the invention works very satisfactorily and allows a considerable degree of precise control over the rates of advance of the extrudate 14 and the filling material 19 supplied to it. Also, the rate of supply of the filling material 19 can be regulated accurately so as to ensure the desired degree of filling, depending upon the nature, temperature, possible expansion and other properties of the materials and any inter-action which there may be between them.

Referring to FIG. 2, this shows the manufacture of a filled extrudate by a method and on an apparatus generally similar to the method and apparatus of FIG. 1 and like parts carry the same references. In FIG. 2, a preferred arrangement of the cutter member is shown in the form of a knife 15a which, unlike the knife 15 of FIG. 1, is inclined so as to cut into the wall of the extrudate 14 from its outside to its inside, as the latter advances past the cutter 15a. It has been found that this ensures a smooth incision in the casing. It is especially preferable, in practice, for the cutter blade 15 to reciprocate in the direction of its cutting edge, so as to open the casing 14 by a sawing action, as this ensures that the cutter blade remains fully effective in producing a smooth and even opening 20 in the casing 14. Also, it can be seen that the cutter 15a is located a substantial distance in advance of the filling supply duct 16, in the direction of movement of the extrudate 14, which ensures that a slit or slot 20a of appreciable length is formed, as the casing is opened by the cutter 15a and then moves to the duct 16. This long slit or slot 20a is highly effective in allowing steam or other gaseous products evolved from the extrusion-cooked casing 14 to escape from the extrudate 14 and especially from its inside, before it reaches the outlet 17 from the supply duct 16 and so receives the filling material. FIG. 2 also shows that the supply duct 16 can be arranged to terminate in an advanced position in the extrudate 14 relative to application of the force system 12, i.e. downstream of the point of application of these forces. Also, this extends the length between opening of the extrudate by the knife 15a and introduction of the filling material 19 as it is discharged at the outlet 17 from the duct 16, which can have an extension 17a for this purpose, which in use is wholly located within the hollow interior of the extrudate 14.

FIG. 3 shows the discharge end of a cooker/extruder die 24, having a shaping collar 25 with a discharge aperture 26 with any desired cross-section e.g. oblong, circular or, as shown, square, from which the unitary casing or extrudate 14 is discharged. Within the collar aperture 26, a solid mandrel 27 is preferably arranged, which serves to support the blade 28 of a cutter in the form of a laboratory scalpel 29 which is supported, e.g. from the collar 25, so as to be inclined relative to the horizontal axis through the die 24, the collar 25 and the mandrel 27.

The steps of extrusion cooking and opening of the casing, carried out as shown in FIG. 3, are followed by the filling step, shown in FIGS. 4 to 6. In FIG. 4, the extrudate 14, again shown as a hollow unitary square or rectangle in cross-section and having an upper web 14a and a lower web 14b, has the slit 20 formed by the cutter 28 in its top web 14a. The adjacent edges may return to be in contact after passing the cutter blade 28, as shown at 20, or they may remain spaced apart, so as to form a slot, as shown at 20a, until the filling material supply duct shown at 30 in FIG. 4 is reached. The duct 30 preferably has a cross-section at its lower or outlet end 30a as shown in FIG. 6, the arrow 10 again indicating the direction of advance of the extrudate 14 relative to the duct 30. The outlet end 30a is preferably made with a relatively flattened cross-section which defines a point 30b where the slit halves of the top web 14a pass to either side in operation. The duct 30 is, in practice, preferably located a substantial distance downstream from the blade 28 of FIG. 3, e.g. a distance in the range from 20 to 50 cm, for instance 30 cm. The blade 28 can take the form of a circular knife, which if desired can be made to rotate.

FIG. 5 shows a variant, in cross-section, in which the duct 30 receives a first filling material, as shown at 11, and discharges it from its lower or outlet end 30a so that it forms a layer 19a contained in the lower half of the casing 14. For this purpose, the outlet end 30a is desirably located close to the floor or lower web 14b of the extrudate 14. In order to provide a second filling material, e.g. of a different colour from the first, a second supply duct 31, also preferably having the cross-section shown in FIG. 6 at its lower end 31a is provided. The second duct 31 is desirably located downstream from the first duct 30 by a distance which is of the same order as that separating the first duct 30 from the cutter blade 28, e.g. in the range from 20 to 40 cm, for instance 30 cm. The second duct 31 discharges a second filling material 19b from its outlet end 31a and so fills the remaining space within the extrudate 14. The outlet end 31a of the second supply duct 31 should be located above the upper surface of the first filling 19a and is therefore preferably positioned adjacent the upper web 14a of the casing or extrudate 14.

EXAMPLE

In order to illustrate the method and operation of the apparatus of the invention, a number of tests were carried out. The formulation of the extrudate was based upon wheat flour and any of the following dough ingredients could be included:

Biscuit wholemeal flour: 0–50%
Medium granulated sugar: 0–20%
Salt: 0.5–2.0%
Whey powder: 0–2%
Tetra-sodium-pyrophosphate: 0–1%

The amounts indicated are by weight. However, various other ingredients can be used, in conjunction with or instead of some of the ingredients mentioned. The extrudate is usually processed so that it leaves the die at approximately 180° C. Referring to FIG. 3, the die 24 used for this work had a 6 mm: 4 mm annulus, with the solid mandrel 27. The material expanded to a given shape which was controlled by the collar 25, e.g. a 19×16 mm oblong shape. As the extrudate 14 left the collar 25, it was slit in the upper surface or web 14a (FIG. 4) with the laboratory scalpel 28 held in place on the mandrel 27. Approximately one foot (30 cm) downstream, all the steam had come away from the extrudate 14 and the filling pipe or duct 30, inserted through the slit 20 (20a), was used to pump a filling material at 40°–50° C. into the tube centre.

A typical cream filling formation is as follows, again in amounts by weight:
Fat: 35%
Icing sugar: 31%
Lactose 30 powder: 31%
Cocoa powder: 3%

Also, a commercial caramel was successfully filled into the extrudate 14, using this technique.

A double cream filling (FIG. 5) was made by placing the second filler pipe or duct 31 one foot (30 cm) downstream from the first, 30. The outlets from each duct inside the extrudate 14 was adjusted to prevent mixing of the two coloured creams.

It was found that filling of the extrudate 14 using this technique, whether one or two separate fillings were provided, resulted in continuous filling without any air/steam pockets being present. Previous experiments using a filling pipe in place of the solid mandrel 27 resulted in uneven filling with breaks in the cream or caramel. Besides giving even filling the split tube process of the invention can be stopped and started easily while continuously running the extruder. Also by changing either the die 24 or the mandrel 27 to a different size, the ratio of cream casing can be altered over a wide range of product sizes.

I claim:
1. A method of making filled foodstuffs, which comprises:
   (i) discharging an extrudable foodstuff from a die so as to form said foodstuff into an extruded unitary tubular casing having a cross-sectional shape of closed-loop form as extruded,
   (ii) advancing the resultant tubular casing relative to a cutter member and thereby making a longitudinal opening through the wall of the tubular casing and into its hollow centre,
   (iii) further advancing the tubular casing relative to at least one supply duct for foodstuff filling material, said at least one supply duct being located downstream of said cutter member in the direction of relative advance of said tubular casing,
   (iv) locating said at least one supply duct within the longitudinal opening formed by the cutter member in said wall of the tubular casing and thereby positioning an outlet discharge end of said at least one supply duct inside the hollow centre of the tubular casing,
   (v) introducing at least one foodstuff filling material through said at least one supply duct and out of said outlet discharge end thereof into said hollow centre of the tubular casing as said tubular casing continues to advance relative to said at least one supply duct, and
   (vi) applying to the resultant filled tubular casing, at a location downstream of said at least one supply duct, a force which closes the longitudinal opening in the wall of the tubular casing.

2. A method as claimed in claim 1, in which said longitudinal opening is formed in the uppermost part of the extruded casing.

3. A method as claimed in claim 1, wherein said force includes a component in the direction of advance of the casing, whereby a pulling or stretching action is exerted on the filled casing.

4. A method of making a filled extruded food product, which comprises extruding a unitary tubular casing of food stuff having a cross-sectional shape of closed-loop form as extruded, slitting the tubular casing to form a single longitudinal opening through a wall thereof, filling the interior of the slit casing through said opening with a food stuff, and closing the opening over the filling by bringing into contact with each other the edges of the opening formed by slitting.

5. A method as claimed in claim 4, in which said casing is of pastry.

* * * * *